(12) United States Patent
Arsenault

(10) Patent No.: US 9,066,131 B1
(45) Date of Patent: Jun. 23, 2015

(54) ADVERTISING SPOTS FOR FAST-FORWARD PLAY

(75) Inventor: Robert G. Arsenault, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2399 days.

(21) Appl. No.: 10/426,732

(22) Filed: Apr. 30, 2003

(51) Int. Cl.
   *H04N 7/10* (2006.01)
   *H04N 7/025* (2006.01)
   *H04N 21/432* (2011.01)
   *H04N 21/433* (2011.01)

(52) U.S. Cl.
   CPC ......... *H04N 21/432* (2013.01); *H04N 21/4333* (2013.01)

(58) Field of Classification Search
   USPC .......................................................... 725/36
   See application file for complete search history.

(56) References Cited

U.S. PATENT DOCUMENTS

| | | | |
|---|---|---|---|
| 5,155,591 A | 10/1992 | Wachob | |
| 5,506,615 A | 4/1996 | Awaji | |
| 5,528,282 A | 6/1996 | Voeten et al. | |
| 5,606,359 A | 2/1997 | Youden et al. | |
| 5,732,217 A | 3/1998 | Emura | |
| 5,786,845 A | 7/1998 | Tsuria | |
| 5,815,146 A | 9/1998 | Youden et al. | |
| 6,006,257 A * | 12/1999 | Slezak | 725/110 |
| 6,070,186 A | 5/2000 | Nishio | |
| 6,160,570 A | 12/2000 | Sitnik | |
| 6,460,018 B1 * | 10/2002 | Kasai et al. | 705/8 |
| 6,757,482 B1 * | 6/2004 | Ochiai et al. | 386/83 |
| 6,909,837 B1 * | 6/2005 | Unger | 386/68 |
| 7,185,353 B2 * | 2/2007 | Schlack | 725/35 |
| 7,246,367 B2 * | 7/2007 | Iivonen | 725/102 |
| 2001/0049820 A1 | 12/2001 | Barton | |
| 2002/0144262 A1 * | 10/2002 | Plotnick et al. | 725/32 |
| 2003/0088872 A1 * | 5/2003 | Maissel et al. | 725/46 |
| 2004/0103429 A1 * | 5/2004 | Carlucci et al. | 725/32 |
| 2006/0271979 A1 * | 11/2006 | Hejna | 725/89 |

OTHER PUBLICATIONS

Program/Episode/Version Identification ATSC Standard, Advanced Television Systems Committee, Doc. A/57, Aug. 30, 1996.

* cited by examiner

*Primary Examiner* — Mushfikh Alam

(57) ABSTRACT

A method for playing previously broadcast commercial spots from cache memory in real-time to provide a smooth and deliberate playback of an advertisement even during trick-mode playback. In one embodiment of the present invention, several versions of specific commercials are delivered to a receiver during an original commercial spot and the appropriate commercial version is displayed depending on the play back speed chosen by the consumer. When the play back speed is normal, the original advertisement version is viewed. When the fast forward trick mode is employed, a version of the advertisement having a reduced duration and a reduced content from the original version, is played at normal speed. In another embodiment of the present invention, the original production video is accompanied by one or more edit decision lists that mark segments of the original video content to be played for a specific trick-mode rate to create a modified version of the advertisement.

13 Claims, 4 Drawing Sheets

ADVERTISING SPOTS FOR FAST-FORWARD PLAY

TECHNICAL FIELD

The present invention relates generally to set top receiver boxes with hard disks, and more particularly to playback modes for the media recorded on the hard disk.

BACKGROUND OF THE INVENTION

Set top boxes are known to incorporate hard disks to allow customers, or viewers, to locally cache, or store to memory, television programming to be played back at a later time. The play back can occur in either true-speed mode or in reverse or fast-forward trick modes. It is well known that the consumer employs fast forward trick mode during play back to skip over commercials. Currently, video that is locally stored is only suited for playback at a true speed. Therefore, when a customer fast forwards through commercial advertisements, the customer sees either a sped up version of the commercial or garbled un-intelligible video with high-pitched or no audio.

Trick-mode playback speed presents a significant disadvantage for an advertiser that has paid for the advertisement to be played during a commercial spot that never gets viewed by the consumer. The customer who fast forwards over commercial spots is not receiving the message the advertiser has paid to be conveyed to consumers.

Attempts have been made to allow advertisers to make their impressions on consumers even when the program is being fast forwarded. In one example, U.S. Pat. No. 6,070,186 to Nishio, the commercial video programming is transmitted from a special video storage unit that prevents the consumer from skipping the commercials, even when the fast-forward command is given by the consumer. This method requires two-way communication between the receiver and the video storage unit, and furthermore, no doubt leads to much frustration on the part of the consumer.

In another example, U.S. Pat. No. 5,732,217 to Emura, the video system plays back at the speed commanded by the consumer, but reads out key frames at a predetermined interval and transmits the key frames for display to satisfy a reduced playback time without allowing the customer to completely skip over the commercial. However this method provides an interrupted, or choppy, commercial for the consumer.

There is a need for a commercial spot to play smoothly and deliberately, conveying the appropriate message to the consumer during play back, even during trick-modes for playback that include fast forward and fast rewind.

SUMMARY OF THE INVENTION

The present invention is a method for playing broadcast commercial spots in real-time to provide a smooth and deliberate playback of an advertisement even during trick-mode playback. In one embodiment of the present invention, several versions of specific commercials are delivered to a receiver during an original commercial spot and the appropriate commercial version is displayed depending on the play back speed chosen by the consumer. When the play back speed is normal, the original advertisement version is viewed. When the fast forward trick mode has a speed of two times the original speed, a version of the advertisement having half of the duration of the original advertisement, and reduced content from the original version, is played at normal speed. When the fast forward speed is four times, a modified version of the advertisement having one fourth of the duration of the original advertisement is displayed at normal speed, and so on.

In another embodiment of the present invention, rather than caching specially produced versions of the advertisement, the original production video is accompanied by one or more edit decision lists that mark segments of the original video content to be played for a specific trick-mode rate. Only one version of the video/audio segment will be cached along with specific instructions to reduce that production to even shorter run-time duration.

It is an object of the present invention to preserve intelligible video and audio during trick-mode playback of recorded media. It is another object of the present invention to allow a consumer to choose an arbitrary trick-mode playback speed and still display a spot that views smoothly and normally.

It is a further object of the present invention to locally store alternate versions of a commercial that are differentiated from an original production of the commercial by being cut shorter in duration.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
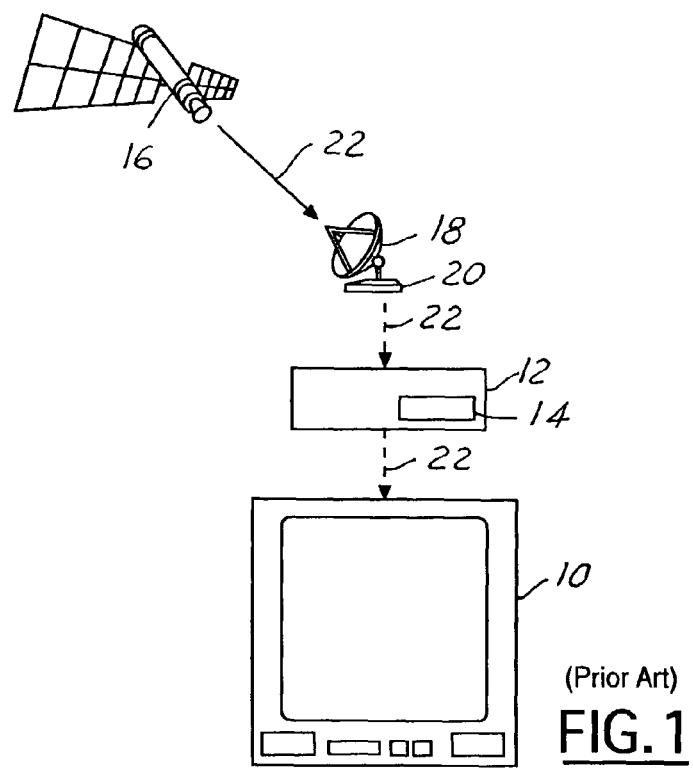
FIG. 1 is a block diagram of a typical consumer television with a receiver having hard disk storage of television media broadcast to the receiver.

FIG. 1 is a simplified block diagram of a typical configuration of a consumer location having a television 10 and a set top receiver 12 having hard disk storage 14 capabilities. The receiver 12 is capable of storing broadcast media for play back at a time chosen by the customer. The media is broadcast by satellite 16, cable, or another form of media, not shown in FIG. 1 to a dish antenna 18 at the customer site. The receiver 12 receives the broadcast signal 20 from the dish antenna 18.

The receiver 12 may be sophisticated enough to choose what media 22 it wants to receive. There are several methods of characterizing broadcast signal 20 that are dependent upon static and dynamic criteria. These criteria may be filtered at the receiver 12 and used in the decision making process to determine what portions of the broadcast media 22 reaches the receiver and is stored at the receiver 12.

In certain aspects of the invention, data included in the broadcast is used to apply the present invention. Some background information is provided hereinafter. The static and dynamic criteria of the video and the receivers are included in the broadcast media. Static video descriptions of some criteria include, but are not limited to, video format, audio format, run-time, actors, and genre. Static receiver characteristics include, but are not limited to, central processing unit (CPU), hard disk size, and the amount of random access memory (RAM). The geographic location of the receiver 12 may also influence the content of the broadcast video.

Dynamic video criteria include programming authorization. This includes programming services purchased by the customer, such as HBO. Other dynamic criterion is customer viewing preferences, program ratings and limitations set by the customer. Dynamic receiver characteristics include the amount of free space on the hard disk and any scheduled tuner conflicts.

The static and dynamic criteria can be filtered at the receiver such that the receiver 12 may consider transmitted video for storage. This allows the receiver 12 to offer subscription video on demand services by locally storing the content that is authorized by or best suited for the consumer. It is also possible to locally cache video content and provide local advertising replacement or enhancement. The present invention provides advertisement enhancement during trick-mode playback.

Figure 2:
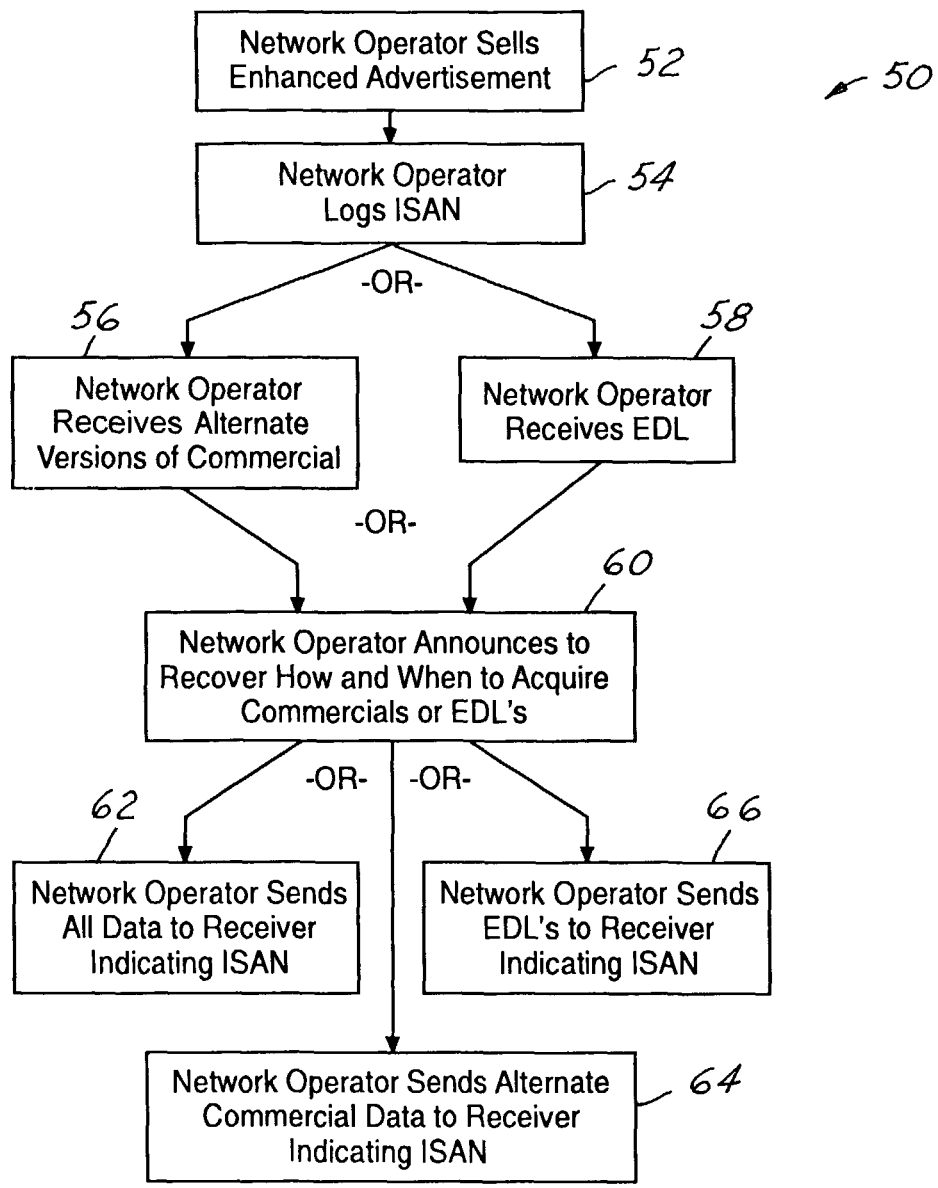
FIG. 2 is a flow chart of a pre-load segment of the present invention that is applicable to all embodiments of the present invention.

FIG. 2 is a flow chart describing a pre-load segment 50 of the present invention. The pre-load segment is applicable to each and every embodiment of the present invention. During the pre-load segment 50 a network operator sells the enhanced advertisement spot 52 to an advertiser. The advertisement has a video segment unique identifier (video segment ID) associated with it according to standard broadcast procedures, such as an International Standard Audiovisual Number (ISAN). The identifier, or ISAN, is logged 54 with the network operator. The network operator receives either alternate versions of a commercial 56, or one or more edit decision lists 58.

The network operator announces 60 to the receiver when and how to acquire the substitute versions of the commercial or the edit decision lists. For example, the network operator may provide the time, frequency, and program identifier (PID) or Service Channel Identifier (SCID) to acquire the substitute program or edit decision lists. It is possible to employ a continuous carousel technique, thereby avoiding the need to indicate a time to the receiver to acquire the data. It is further possible for the receiver 12 to tune established frequencies and PIDs at periodic intervals and regular times, as permitted by the receiver's customer usage, to attempt receipt of substitute versions. It is still further possible to push the substitute versions using an Ethernet broadband connection. The network operator can deliver the data to the receiver in one of several methods. The network operator may bundle 62 the alternate versions of the commercial along with any edit decision lists and transmit all of the data to the receiver. In the alternative, the network operator may send 64 only the alternate versions of the commercials or it may send 66 only the edit decision lists.

Figure 3:
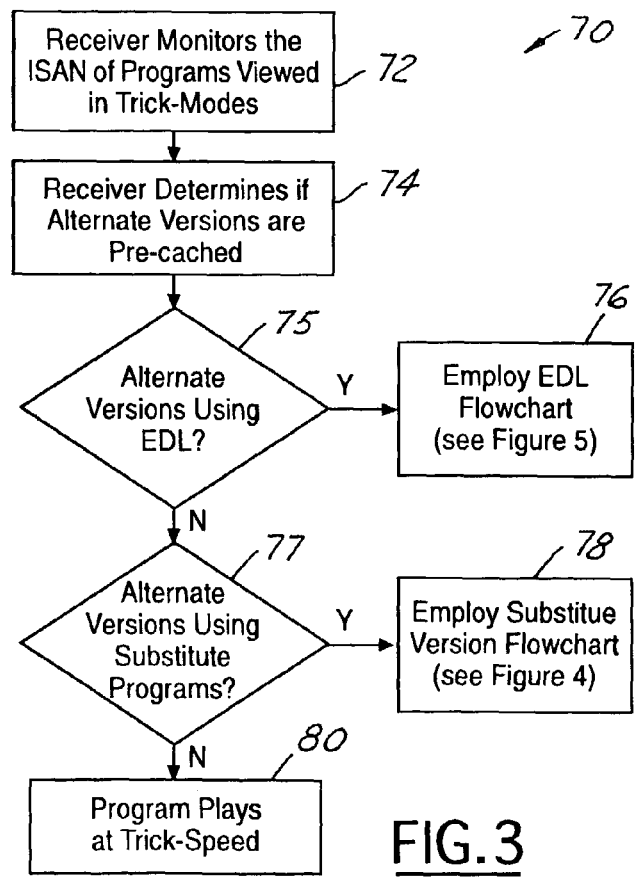
FIG. 3 is a flow chart of a decision making segment of the present invention that is applicable to all embodiments of the present invention.

FIG. 3 is a flow chart describing a method for identifying a commercial for substitution 70 that is also applicable to any and all embodiments of the present invention. The receiver monitors 72 the ISAN of programs viewed in trick modes. The receiver makes a determination 74 if any alternate versions of the program are pre-cached and locates the alternate data. If the alternate version is an edit decision list 75, the receiver utilizes 76 the edit decision list procedure, which is discussed in detail later herein. If the alternate version is substitute programs 77, the receiver follows the protocol 78 discussed in the substitute version flowchart shown in FIG. 4.

For a given video segment ID and the playback trick mode speed, the receiver determines what substitution material or EDL should be applied. For example, for 2× and 8× trick mode playback speeds, substituted video may be provided by the network operator, whereas for 4× and 16× speeds, an EDL is provided and will be applied against the original video segment ID. Should neither the EDL or the alternate version be available, the program plays 80 at the trick speed.

Figure 4:
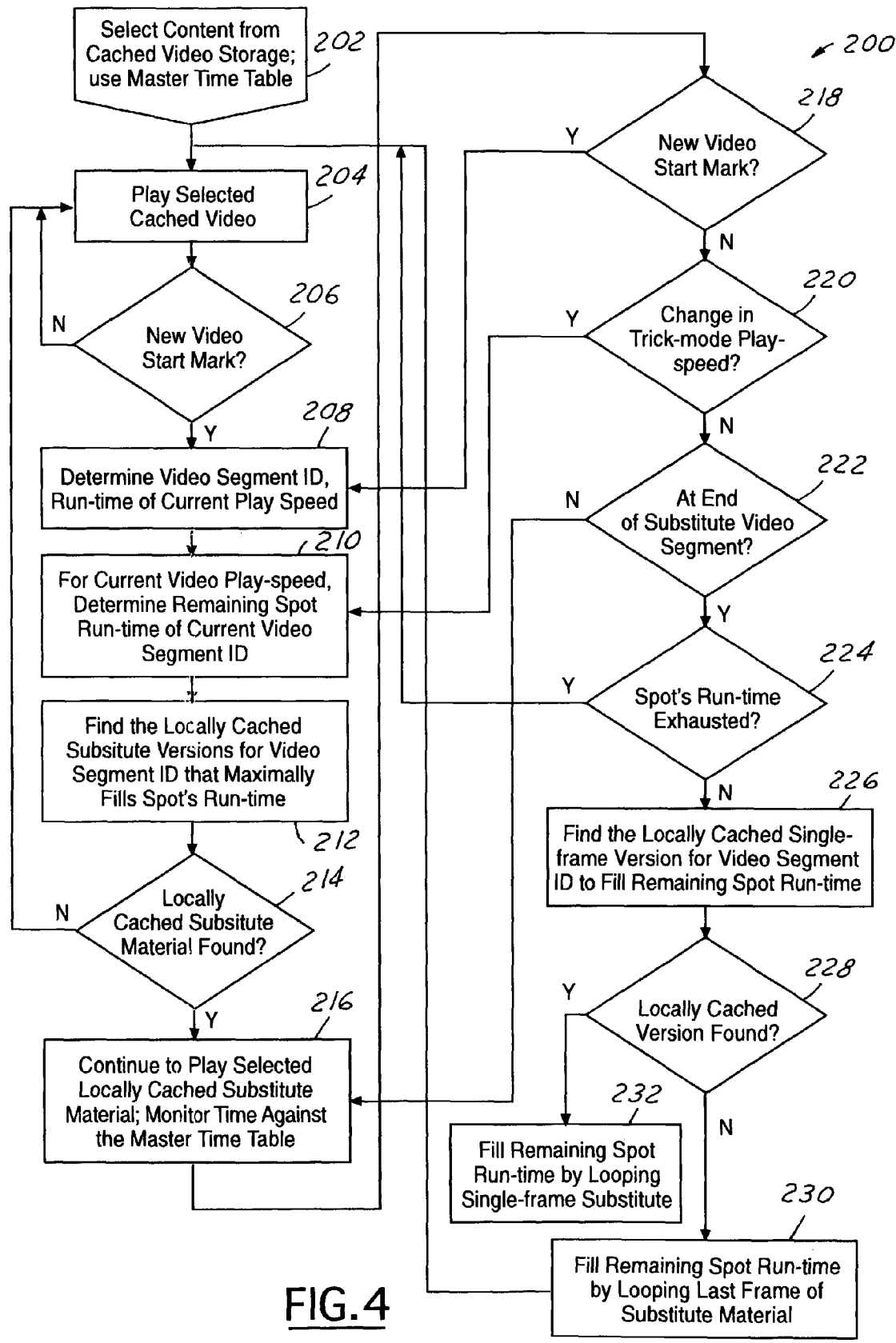
FIG. 4 is a flow chart of an embodiment of the present invention which selects a predetermined version of an original commercial production from multiple versions delivered to the receiver along with the original commercial production.

Referring to FIG. 4, there is shown a flow chart describing how the present invention substitutes alternate versions of a program for display during trick mode viewing. Video content has been delivered to the receiver. The video content contains alternate versions of a particular commercial spot that will be described in detail hereinafter.

In the prior art, video that is stored is only suited for playback at true-speed. The locally stored content that was recorded from a network typically contains advertisements that are promotional for the network or paid advertisements to promote a product. According to one embodiment of the present invention, the receiver locally stores alternate versions of a commercial in addition to the true speed production. The alternate versions may be differentiated from the original production by being cut to a shorter duration. In this regard they are more streamlined and therefore quicker to present their message. In an extreme case, the advertisement version may be reduced to a single frame video that is rendered as a still television image during high-speed fast forward.

Alternate versions of the commercial are broadcast and stored along with the original production. Each secondary copy of the video is suitable for a specific playback speed, so that one can be played properly during a particular fast-forward (or reverse) speed. Different receivers are capable of different playback speeds. According to the present invention, all versions of the commercial will be provided to the receiver. However, the receiver will store a local copy of each speed that the receiver is capable of playing. For example, 1×, 2×, 4×, 8× and 16× versions of the video are provided. The receiver is only capable of 1×, 2× and 8× playback speeds. The receiver may choose to store only 1×, 2× and 8× versions locally. It is also possible that the receiver can store all versions even though it is not capable of playback at a particular speed.

As discussed above, the method of the present invention detects when material that is being played from cache begins a new video segment based on the ISAN. According to the present invention, an auxiliary table is constructed that anticipates upcoming segments. The table can be prepared upon storing the original program in cache memory.

In the original program, self-identifying program information exists in the form of digital MPEG user data, accompanying secondary data streams, or, in an analog VBI line. The self-identifying program information contains unique identifiers per program and per commercial. These identifiers are used as keys to compare to an identifier of the locally cached substitute material. As the program is being recorded, the identifiers are monitored. As a change in an identifier is detected, an entry that contains the timecode of the change and the identifier of the new program is written to the auxiliary table.

During playback, the auxiliary table drives the time calculations for the playing of the original content and any substitute content. SMPTE timecodes are presented for ease in describing the present invention. In actual practice, the timecodes may be a monotonically increasing presentation timestamp that is initialized to zero per program may be used. An example auxiliary table is as follows in Table 1:

TABLE 1

| | | | |
|---|---|---|---|
| 00:00:00:00 | ISAN | 153C-7365-B36F-844C-N | original program start |
| 00:05:00:00 | ISAN | 083A-3317-3E20-0000-6 | commercial #1 begins |
| 00:05:30:00 | ISAN | 2B1A-FF17-3E20-6541-7 | commercial #2 begins |
| 00:06:00:00 | ISAN | 153C-7365-B36F-844C-N | original program resumes |

In addition to the original 30 second video clip for commercial #1, other versions are stored in accordance with the present invention. Versions that are 15 seconds long, 10 seconds long, 5 seconds long and a single frame version. The receiver stores these multiple versions based on a determination that a stored program contained the commercial #1. Then the present invention selects and finds one of the alternate versions that could be scheduled and acquired in anticipation of the eventual playback of the original program whereby the substitutions can be made if trick-mode speeds are employed during playback.

The duration of each commercial is derived by its start time and when the next program identifier is encountered. For example, commercial #1 is derived to be 30 seconds long because its identifier was first encountered at timecode 00:05:00:00 and the next ID that was not for commercial #1 was encountered at 00:05:30:00.

During playback using a trick mode, the program is played faster (or slower) than real-time. Time is still being clocked relative to the auxiliary table created when the program is first recorded. The customer selected trick-mode is known, and a trick-mode rate multiplier is also known. The derived duration of the commercial is divided by the rate multiplier to get the run-time of the commercial in trick-mode. A substitute version of the commercial is found that best fills that run-time and that version is played instead at 1× speed. The consumer still realizes the same run-time duration in either case.

In the event the customer changes the playback mode during fast forward operation, the present invention is capable of adjusting the playback version of the video to accommodate the newly selected speed. The receiver will find the best fit version that will play during a selected trick mode speed. Should the customer adjust the speed, the receiver will attempt to find the best fit version that would play completely in the time remaining portion.

In the event a speed change occurs during a commercial, the remaining time is calculated at the new speed, and the best fit version for the remaining time is substituted. In the worst case, the only version that will fill the time is the single-frame graphic that can be looped as needed to fill the remaining video spot. A single-frame video clip consists of a key-frame picture. If a single-frame graphic is not available, then the last key from picture of the substituted video clip can be used as a single frame graphic.

Alternatively, the system can revert back to the original content, which can be finished in trick-play mode. In this case, the system can index into the remaining portion of the original video, and resume at the current trick-mode play rate.

At no time will the substituted video run longer than the original content would have given the trick mode. Every substituted video piece is carefully chosen before it begins play so that it will finish before its allotted run-time is over. In order to accomplish this, the system tracks time against the master time table adjusted by the trick-mode rate multiplier.

Referring still to FIG. 4 a detailed flow chart of the method described above is shown. The desired content is selected 202 from cached video storage. A master time table exists from its creation as the video was stored from its original broadcast. The selected video is played 204. The method checks 206 for the start of a new video segment. In the event no identifier is located, the video continues to play 204 and the method continues to check for the start of a new video segment. In the event a new video segment mark is identified, the method determines video criteria 208 such as the video segment identifier, the run-time and the current play speed of the receiver.

Depending on the current video play-speed, a determination 210 is made of the remaining spot run-time of the current video segment. Once a determination of the remaining time has been made, the locally cached substitute version for the video segment identifier that maximally fills the remaining run-time at the proper playback speed is determined 212. The method checks to make sure the locally cached substitute material if found 214. If the substitute material is not found, the method continues to play the selected cached video 204 at the selected playback speed.

Upon finding the locally cached substitute material, it is played 216 in place of the original video segment, and the present invention continues to monitor the time against the master auxiliary table. The present invention checks again 218 for a new video start mark and monitors 220 for a change in the trick-mode play speed. In the event a new video start mark is identified, the program returns to the point of determining the video segment identifier, run-time and current play speed 208. Upon detection 220 of a change in the trick-mode play speed, the present invention returns to the point of determining 210 the remaining run-time for the current video play speed.

The program continually monitors for the end of the substituted video segment. While the segment is still running, the present invention continues to determine the remaining spot run-time 210. Once the end of the video segment has been reached, the present invention determines if the spot's run-time has been exhausted 224. Upon exhaustion of the spot's run time, the present invention continues to play the selected cached video from storage. Should time still remain, the present invention finds 226 the locally cached single-frame version for the video segment identifier to fill the remaining spot run-time with a still image.

The present invention confirms 228 that a single-frame locally cached version can be found. In the event no single-frame locally cached version can be found, the present invention fills the remaining spot run-time by looping 230 the last frame of the substitute material. When a single-frame version is available, the present invention fills the remaining spot run-time by looping 232 the single-frame version.

According to another embodiment of the present invention, only one version of the video content is delivered to the receiver and one or more edit decision lists (EDL) are created that reduce the original version to a size that can be played in the time remaining during trick-mode playback.

Typically when a digital video recorder plays a locally cached video/audio stream in a trick-mode speed, the video player captures the audio and video MPEG elementary streams as media blocks in a storage buffer. During playback, a pointer traverses the stored media blocks. In fast forward, the playback pointer runs at a rate multiplied by the trick-mode speed, and jumps to key frames only.

Referring back to FIG. 2, the flow chart of the method 50 of the present invention applies to this embodiment as well. Program content is delivered 62, 66 to the receiver. In the present embodiment, the content is delivered with video only suited for playback at true speed. At least one edit decision list (EDL) is broadcast along with the video. The video content, including the EDL is stored on the hard disk of the receiver and the receiver monitors 72 the ISAN as described in FIG. 3. When the video is retrieved for playback, the receiver detects the beginning of a new video segment in material played from cache memory and applies the EDL protocol that is described hereinafter.

Figure 5:
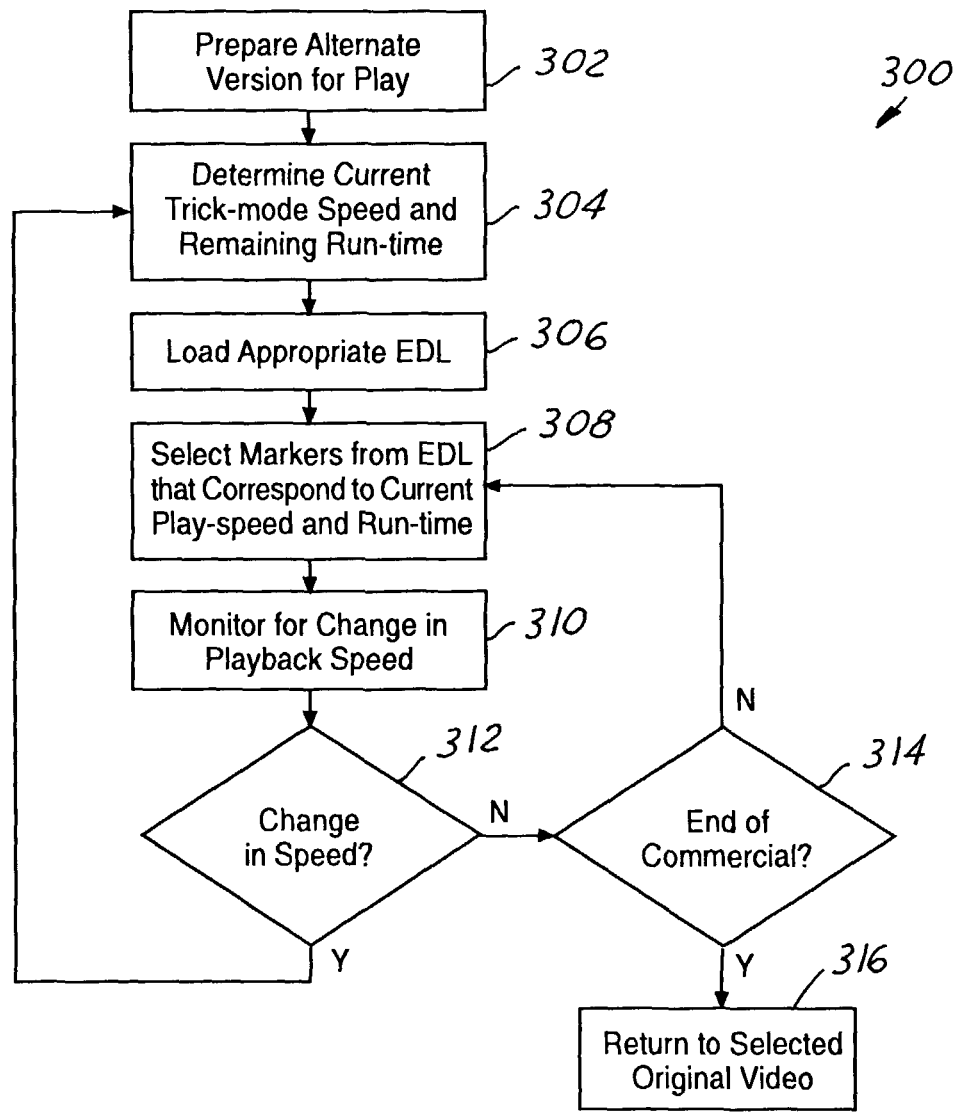
FIG. 5 is a flow chart of the method of the present invention that creates edit decision lists to make modifications to the original commercial production during fast forward playback modes.

Referring now to FIG. 5, there is shown a specific flow chart for the alternate embodiment 300 of the present invention. Once the program has been identified for retrieval and playback, the receiver prepares 302 the alternate version for play. The receiver determines 304 the current trick-mode speed and the remaining run-time in order to load 306 the appropriate edit decision list (EDL). The EDL list is stored and held ready for each trick-mode rate. For example, in two-times speed, an EDL list is stored that is retrieved upon the customers selection of two-times fast forward speed. The EDL list contains markers that identify which frames of the original video content are to be played for the two-times speed trick mode rate.

During trick mode playback of the program content, the EDL list is utilized 308 to cut to key frame sequences, thereby editing the commercial version to a shorter version, more appropriate for the two-times playback speed. Transition effects other than "cut" may also be supported according to the sophistication of the receiver's on-line editing abilities, including "fade", "wipe", etc. If a receiver lacks support for a directed transition effect, the receiver may substitute the closest effect it has to the preferred effect. The present invention determines the video segment identifier, the run-time and the current play speed. From there, the receiver selects the appropriate markers from the EDL that correspond to the run-time and the current play speed to produce an edited version of the original program version to be displayed in real-time to the viewer during trick-mode play.

In the event the trick-mode is changed during playback, the receiver monitors 310 for a change in the playback speed. If a change is detected, the receiver again determines the current trick-mode speed and remaining run-time to select the appropriate EDL. If there is no change, the current EDL is employed until the end of the commercial, and then returns to the selected original video for playback.

It is preferred that the EDL terminates with a picture frame appropriate for sustained viewing, or if none is available, the EDL should end by cutting, or fading to black.

The invention covers all alternatives, modifications, and equivalents, as may be included within the spirit and scope of the appended claims.

What is claimed is:

1. A method for presenting video content during trick-mode playback, the method comprising the steps of:
    delivering the video content to a receiver having hard drive storage capability, wherein the video content is an advertisement to be played during a predetermined commercial spot;
    delivering an edit decision list having selected key frames of the video content to the receiver;
    selectively storing video content on the hard drive;
    calculating a time remaining for playback of the advertisement based on a master time table and a current playback speed of a current trick mode wherein the current trick mode is selected from a group consisting of a fast forward trick mode and a rewind trick mode and excludes forward playback at real time speed, comprising the steps of:
        determining a current playback speed of the current trick mode;
        determining a current video segment identifier; and
        determining a remaining spot run time from the current playback speed and the current video segment identifier;
    selecting a version of the video content to be displayed during playback at the current playback speed, such that a selected version includes the selected key frames from the edit decision list;
    recognizing a change in the playback speed of the current trick-mode;
    determining the changed playback speed of the current trick mode;
    determining a remaining spot run time for the determined changed playback speed;
    selecting a substitute version of the video content that maximally fills the remaining spot run time; and
    playing back the substitute version of the video content.

2. The method as claimed in claim 1, wherein the step of delivering video content further comprises the step of delivering more than one version of the advertisement, each of the more than one versions having a time length that corresponds to a playback speed for the current trick mode.

3. The method as claimed in claim 2, wherein the step of delivering more than one version of the advertisement further comprises delivering a single-frame version of the advertisement.

4. The method as claimed in claim 3, further comprising the steps of:
    selecting the single-frame version of the advertisement; and
    looping the single-frame version to fill the remaining spot run time.

5. A method for playing a video content in real-time to provide a smooth and deliberate playback of previously broadcast video content from cache memory using trick-mode playback, said method comprising the steps of:
    delivering a video content to a receiver having hard drive storage capability;
    delivering more than one version of an advertisement in the video content;
    delivering an edit decision list in the video content;
    selectively storing video content on the hard drive;
    calculating a time remaining for a commercial spot based on a master time table and a current playback speed for a current trick-mode, wherein the current trick mode is selected from a group consisting of a fast forward trick mode and a rewind trick mode and excludes forward playback at real time speed, comprising the steps of:
        determining the current playback speed of the current trick mode;
        determining the current video segment identifier; and
        determining a remaining spot run time from the current playback speed of the current trick mode and the current video segment identifier;
    selecting one of the versions of the advertisement to be displayed during the remaining spot run time such that a selected version includes the selected key frames from the edit decision list;
    recognizing a change in the current trick-mode playback speed;
    determining the changed playback speed;
    determining the remaining spot run time for the changed playback speed; and selecting a substitute version of the video content from the one of the versions of the advertisement that maximally fills the remaining spot run time;

whereby a smooth and deliberate playback of the video content is displayed at the changed trick-mode playback speed.

6. The method as claimed in claim 5, further comprising the step of delivering a single-frame version of the advertisement in the video content.

7. The method as claimed in claim 6, further comprising the steps of:

selecting the single frame version; and looping the single frame version to fill the remaining spot runtime.

8. The method as claimed in claim 5, further comprising the steps of:

selecting the last frame of the substitute version; and looping the last frame of the substitute version to fill the remaining spot run time.

9. A method for playing a video content from cache memory using trick-mode playback, said method comprising the steps of:

delivering the video content to a receiver having hard drive storage capability;

delivering an edit decision list relating to a particular video segment in the video content;

selectively storing the video content on the hard drive;

calculating a time remaining for a commercial spot based on a master time table and a current trick mode playback speed, wherein the current trick mode is selected from a group consisting of a fast forward trick mode and a rewind trick mode and excludes forward playback at real time speed;

selecting key frames of a particular video segment using the edit decision list to create a version of the advertisement to be displayed during the remaining spot run time;

recognizing a change in the current trick mode playback speed;

recalculating a remaining run-time for the video segment; and reselecting key frames for playback from the edit decision list based on the remaining spot run time;

whereby a smooth and deliberate playback of the video content is displaying at the current trick-mode playback speed.

10. A method for playing back video content having an advertisement, the method comprising the steps of:

playing back the advertisement at a playback speed of a current trick mode excluding forward playback at real time speed;

recognizing a change in the playback speed of the current trick mode;

determining the changed playback speed of the current trick mode;

determining a remaining spot run time for the advertisement at the determined changed playback speed;

selecting a substitute version of the advertisement that maximally fills the remaining spot run time; and playing back the substitute version of the advertisement.

11. The method of claim 10, wherein:

the method further comprising the steps of receiving an edit decision list having key frames of the advertisement;

the step of playing back the advertisement at a playback speed of the current trick mode comprises the steps of:

selecting key frames for playback from the edit decision list;

playing back the selected key frames; and the step of playing back the substitute version of the advertisement comprises the steps of:

reselecting key frames for playback from the edit decision list for the remaining spot time; and playing back the reselected key frames.

12. An apparatus for playing back video content having an advertisement, the method comprising the steps of:

means for playing back the advertisement at a playback speed of a current trick mode, the current trick mode excluding forward playback at real time speed;

means for recognizing a change in the playback speed of the current trick mode;

means for determining the changed playback speed of the current trick mode;

means for determining a remaining spot run time for the advertisement at the determined changed playback speed;

means for selecting a substitute version of the advertisement that maximally fills the remaining spot run time; and means for playing back the substitute version of the advertisement.

13. The apparatus of claim 12, wherein:

the apparatus further comprises means for receiving an edit decision list having key frames of the advertisement;

the means for playing back the advertisement at a playback speed of the current trick mode comprises:

means for selecting key frames for playback from the edit decision list;

means for playing back the selected key frames; and the means for playing back the substitute version of the advertisement comprises:

means for reselecting key frames for playback from the edit decision list for the remaining spot time; and means for playing back the reselected key frames.

* * * * *